United States Patent [19]

Iversen

[11] 4,049,485
[45] Sept. 20, 1977

[54] CORRUGATING MACHINERY

[75] Inventor: Bjorn Iversen, Wilmslow, England

[73] Assignee: Simon Container Machinery Limited, Stockport, England

[21] Appl. No.: 660,633

[22] Filed: Feb. 23, 1976

[30] Foreign Application Priority Data

Mar. 8, 1975 United Kingdom .................. 9742/75

[51] Int. Cl.² ............................................. B31B 31/00
[52] U.S. Cl. .................................. 156/351; 156/358; 156/378; 156/470
[58] Field of Search .................... 156/60, 64, 378, 358, 156/210, 205, 470-473, 351

[56] References Cited

U.S. PATENT DOCUMENTS

| 3,472,158 | 10/1969 | Shields | 156/60 X |
|---|---|---|---|
| 3,676,268 | 7/1972 | Brandenburg | 156/210 X |
| 3,829,338 | 8/1974 | Hayasi et al. | 156/64 |

FOREIGN PATENT DOCUMENTS 1,026,808  4/1966  United Kingdom ................. 156/205

Primary Examiner—David A. Simmons
Attorney, Agent, or Firm—Norris & Bateman

[57] ABSTRACT

Apparatus for applying pressure in a controlled manner to a moving web of material for the purpose of transferring heat to the web passing over heating means, for curing the adhesive thus bonding together the component sheets making up the web, includes a plurality of pressure rolls resting directly or indirectly on the web, manual and automatic adjustments for varying the effective weight of the rolls to vary said applied pressure in accord with variations in the speed of the web, such being adjustable for varying the rate of said adjustment, and an arrangement for preselecting a condition such that at zero web speed, the effective weight has an initial positive or negative value.

9 Claims, 4 Drawing Figures

CORRUGATING MACHINERY

This invention concerns apparatus for applying pressure in a controlled manner to a moving web of material, particularly, though not exclusively, in the manufacture of corrugated board wherein a fluted paper medium is faced with an unfluted paper liner, the pressure being applied for the purpose of transferring heat to the board for curing the adhesive thus bonding the components thereof together.

In conventional apparatus a web of corrugated board is pulled over steam chests and is pressed against the upper surface thereof by the under-surface of the lower flight of an endless cotton belt which is loaded downwardly by spaced transversely extending parallel freely rotatable weight rolls engaging the upper surface of the lower flight.

In order to control the amount of heat supplied to the board for curing the adhesives it is desirable to be able to adjust the loading on the cotton belt and hence the pressure between the board and the steam chests. In one known kind of apparatus this is achieved by varying the number of weight rolls engaging the belt by lifting and supporting some thereof in an elevated position. Apparatus of this type is disclosed in U.S. Pat. No. 3,472,158.

An object of the present invention is to provide apparatus generally of the aforesaid kind wherein however all of the weight rolls are adapted to engage the belt, and including means for varying the effective weight collectively of such rolls.

A particular object of the invention is to provide an automatic control system for determining the effective weight of the rolls.

According to the present invention there is provided apparatus for applying pressure in a controlled manner to a moving web of material, including a plurality of pressure rolls arranged to rest directly or indirectly on said web, means for adjusting the effective weight of said rolls to vary said applied pressure, and control means therefor comprising means for effecting said adjustment by increasing said effective weight automatically as the speed of the web increases, means for varying the rate of adjustment, and means for preselecting an initial positive or negative factor of said effective weight.

One embodiment of the invention will now be described with reference to the accompanying drawings in which.

Figure 1:
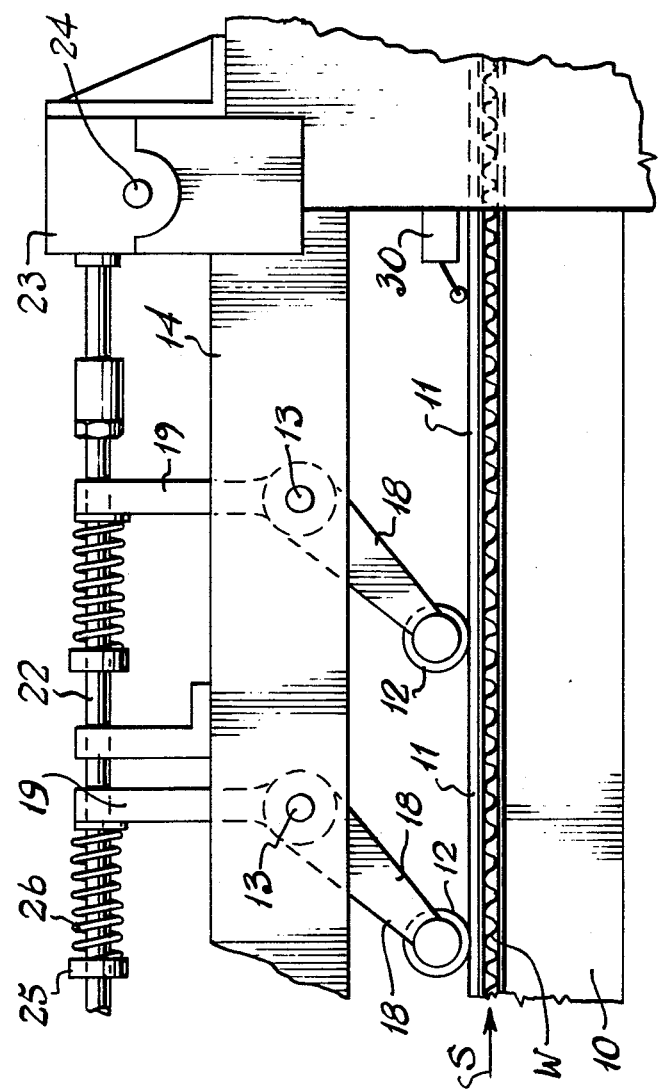
FIG. 1 is a partial side elevation showing a plurality of weight rolls adapted to rest on a travelling web of corrugated board, and means for adjusting the effective weight thereof.

A portion of a corrugating machine is shown in FIG. 1. The machine includes a number of heating chests 10 over which a double-faced corrugated board W is carried, with a continuous cotton belt 11 superimposed thereon.

The lower flight of the belt 11 is urged against the board W by a plurality of parallel spaced transversely extending freely rotatable weight rolls 12 each pivotable at 13 in a main machine frame member 14. Each roll 12 is journaled in bearings at the lower end of a downwardly directed arm 18 which at its upper end is connected to an upwardly directed arm 19. A rod 22 passes freely through the upper end of each arm 19 and extends throughout the length of a heating section. A collar 25 is fixed on the rod 22 adjacent each arm 19 and a coil spring 26 extends between each respective collar and arm. The rod 22 is connected at one end to an actuator 23 which by selective rotation of a shaft 24 therein is arranged to cause the rod 22 to move linearly to the left or right in FIG. 1.

It can be seen therefore that linear movement of the rod 22 to the right in FIG. 1 causes the rolls 12 to lift off the belt 11 whereas movement of the rod 22 to the left allows the roll 12 to rest upon the belt.

The present invention is especially concerned with a control system for ensuring correct and predetermined movement of the rod 22, thus to vary selectively the effective overall weight of the rolls 12 on the belt 11 and thus on the web W.

It will be appreciated that a corrugating machine may include a plurality of sets of weight rolls and each set is mounted on a separate rod 22 connected to a separate actuater unit 23.

Figure 2:
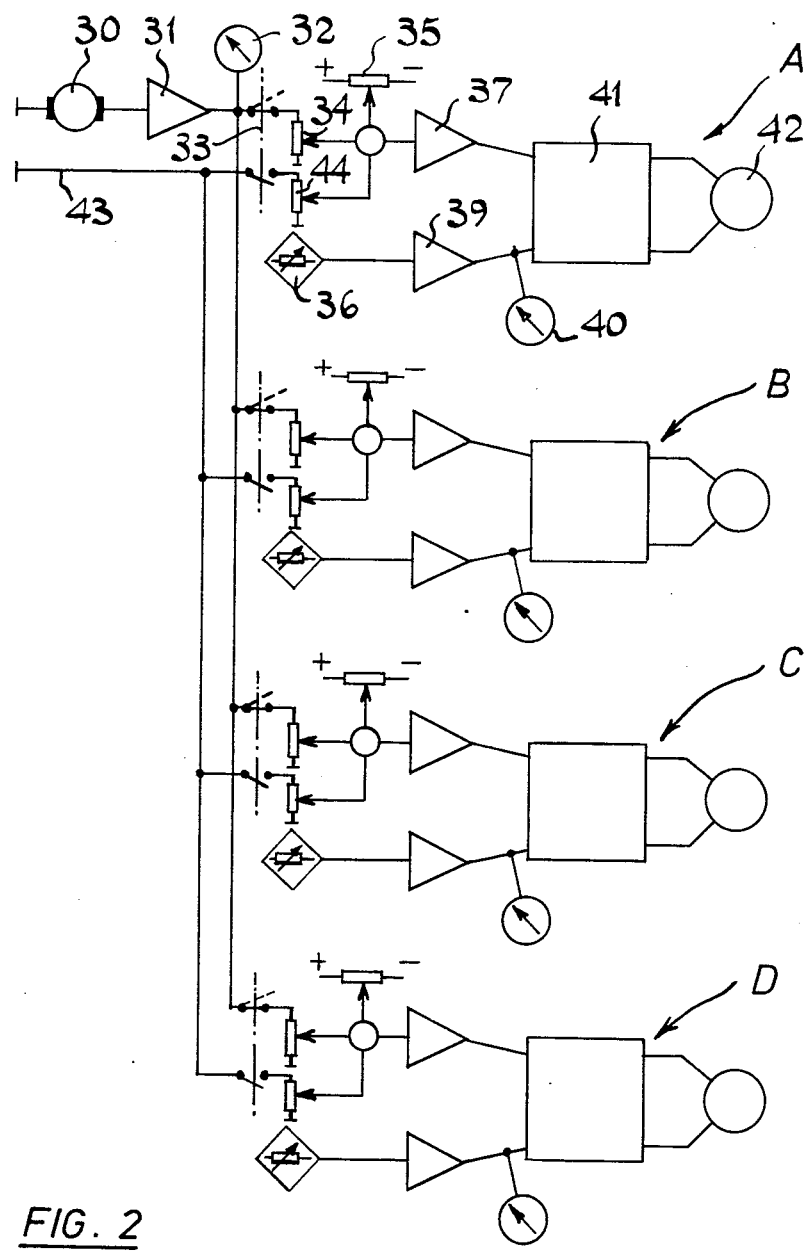
FIG. 2 is a circuit diagram.

Referring now to FIG. 2 there are shown, for example four sections marked A, B, C and D, each serving one actuater unit for one set of rolls. The components of one section only therefore, will be described in detail.

The main circuit comprises a tacho-generator 30 adapted to sense the speed of movement of the belt 11 and thus the web W. An output signal from the generator 30 is fed via an amplifier 31 to a speed indicator 32 and each of the individual circuits for sections A, B, C and D.

Referring therefore to section A there is provided a switch 33, variable potentiometers 34 and 35, a load cell potentiometer 36, amplifiers 37 and 39, an electrical pressure indicator 40, a dual comparator 41 and an electric motor 42.

Each switch 33 is further connected on its input side to a line 43 which when the switch 33 is actuated, can be connected to amplifier 37 via a further variable potentiometer 44.

Figure 3:
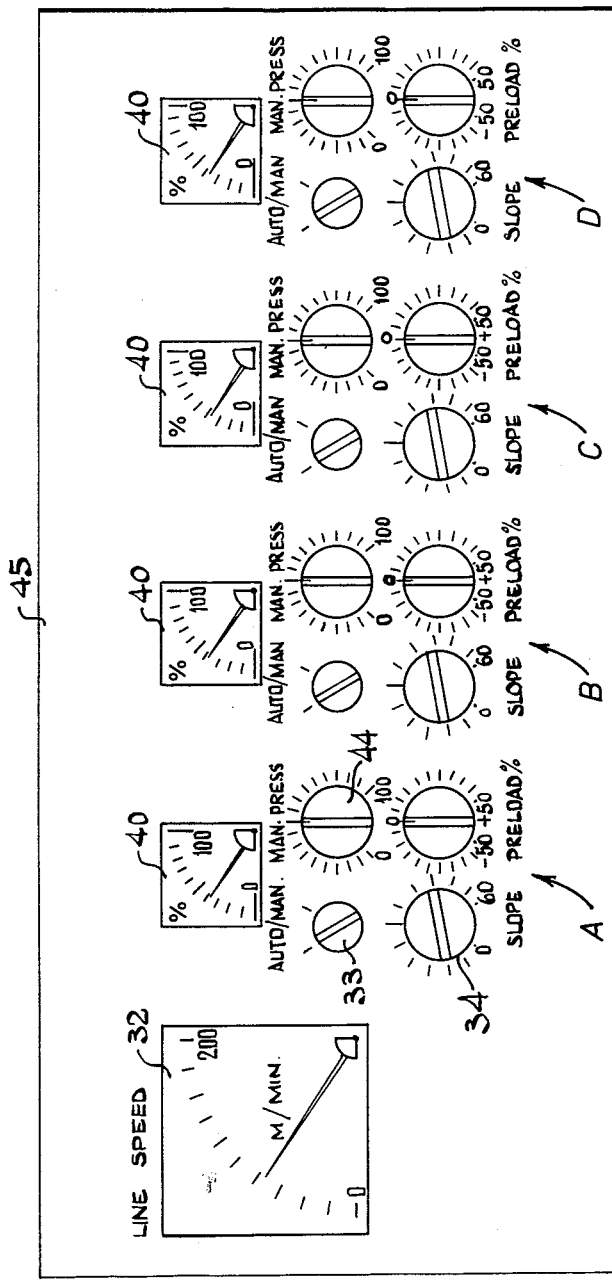
FIG. 3 is an illustration of a control panel for the variable components of the circuit of FIG. 2.

Referring now to FIG. 3, it will be seen that the switch 22 of each section represents an auto/manual control; potentiometer 44 represents a manual pressure control; potentiometer 34 serves to modify the voltage from the generator 30 between 0% and 100% thereof and thus represents a "slope" control, and potentiometer 35 selectively adds to or subtracts from the voltage and thus represents a "pre-load" control. The function of these various controls will now be described in greater detail.

The effective weight of the rolls 12 in each section can be controlled manually or automatically. For manual operation, the switch 33 is operated so that the potentiometer 44 for the particular section is connected to line 43 and thus the associated potentiometer 34 is disconnected from generator 30. The desired pressure or effective weight is selected for the section on the manual pressure control knob or potentiometer 44. During operation the associated load cell potentiometer 36 continuously reads the pressure on the belt 11 collectively applied by the rollers 12. Should the load cell 36 pass a voltage which is greater or less than the "desired" voltage from the potentiometer 44, a resultant output voltage from the conparator 41 causes energization of a motor starter to energize motor 42 and thus rotate the shaft 24 of the unit 23 to adjust the position of the appropriate rod 22. Adjustment is made until the output voltages from the load cell potentiometer 36 and the potentiometer 44 are equal. Thus the required pressure or effective weight of the rolls 12 is maintained.

However, as the speed of the web W varies, it is advantageous to adjust the pressure applied by the rolls and this adjustment can be made automatically as will be described.

For automatic operation of a section therefore, the switch 33 thereof is actuated to connect the generator 30 to the respective potentiometer 34. Thus, potentiometer 44 is automatically disconnected from line 43.

In this case therefore, the constant reference voltage, which for manual operation is fed to the comparator 41 from the potentiometer 44, is replaced by a voltage representing at least in part, the output of the generator 30, and this voltage is compared with the output voltage of the load cell potentiometer 36. Thus, as the speed of the web, and thus the voltage from the generator 30 varies, a resultant output voltage from the comparator 41 again causes the motor 42 to make adjustments of the effective weight of the rolls 12.

The rate of adjustment of the effective weight according to web speed can also be automatically varied and this is done by operating the slope control potentiometer 34 thus to vary the percentage of voltage transmitted from the generator 30 to the comparator 41. Furthermore, a positive or negative initial weight factor can be applied to the rolls prior to commencement of movement of the web. That is to say, up to 50% of the total possible effective weight can be applied before the web moves, or alternatively the web can reach up to 50% of its maximum speed before any effective weight is applied. This is done by adjustment of the pre-load control potentiometer 35, to increase or reduce respectively the voltage from the generator 30 relative to the voltage from the load cell potentiometer 36. Therefore if the potentiometer 34 is set above zero and the potentiometer 35 is set either side of zero, a voltage will pass to the comparator 41 through the amplifier 37, which is a sum of the output voltage of the generator 30 as modified by the potentiometers 34 and the output voltage of the potentiometer 35, and it is this voltage sum which is then compared with that from the load cell potentiometer 36.

Figure 4:
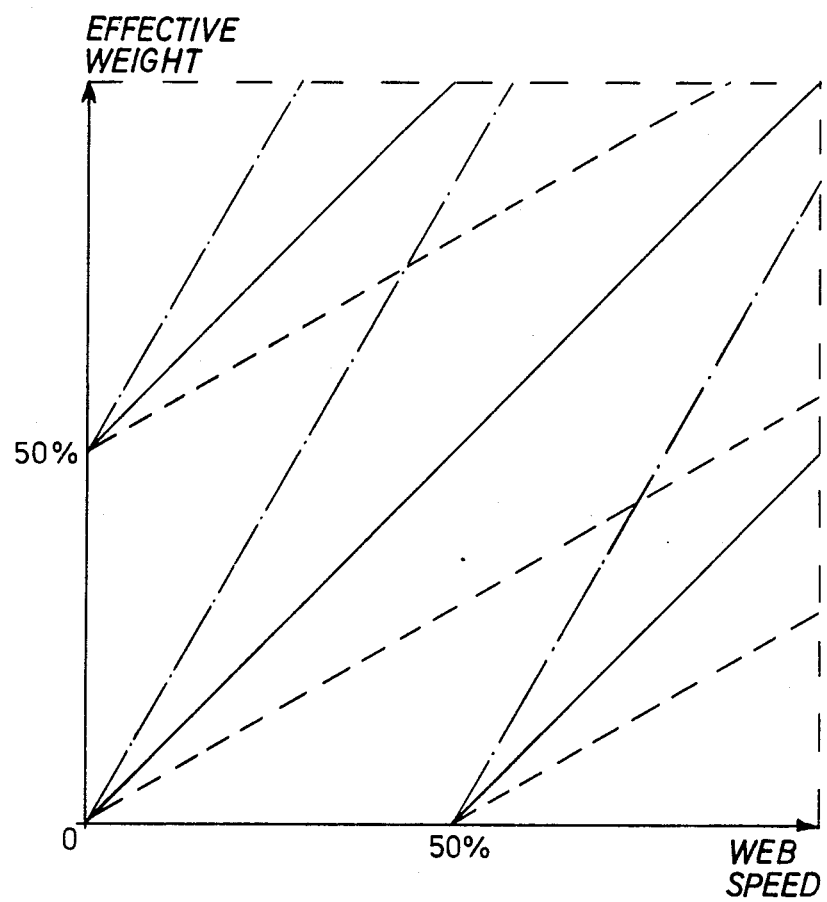
FIG. 4 is a graph showing the effective weight of said rolls plotted in relation to the speed of movement of the web.

Referring now to FIG. 4 the graph represents as a plot of effective weight against web speed, three examples of settings of the potentiometers 34 and 35. For zero weight at zero line speed, the potentiometer 35 is set at zero and the slope control potentiometer 34 is shown as set respectively at approximately 30°, 45° and 60°. These angles represent 3%, 10% and 14% of maximum effective weight per 10 meters per minute line speed change.

The graph also shows further sets of similar curves where the potentiometer 35 is set at 50% positive and 50% negative, respectively.

At 50% positive, 50% of the maximum effective weight is applied before the web commences to move, and the weight increases from 50% as a function of web speed.

At 50% negative, zero weight is applied to the web until the latter reaches 50% of its maximum line speed at which time the weight commences to increase as a positive value and as a function of web speed.

It will be seen therefore that the application of pressure on the web can be varied according to the conditions prevailing and an operator can select the amount of pressure and the rate of application thereof in each section of a machine independently as required.

It is not intended to limit the invention to the above examples only, variations such as might readily occur to one skilled in the art being possible within the scope of the invention as defined by the appended claims.

For example, the elctrical components referred to herein can be replaced by pneumatic or hydraulic equivalent components adapted to carry out the same or similar function to achieve the object herein defined.

What is claimed is:

1. Apparatus for applying pressure in a controlled manner to a moving web of material, including a plurality of pressure rolls arranged to rest directly or indirectly on said web, means for adjusting the effective weight of said rolls to vary said applied pressure, drive means for said adjusting means, means for sensing the pressure applied by said rolls and providing a signal corresponding to said pressure, means for sensing the speed of movement of said web and providing a signal corresponding to said speed, means for continually comparing said signals from said pressure and speed sensing means and for automatically actuating said drive means accordingly thus to cause the effective weight of said rolls to vary as the speed of the web varies, means for varying the rate at which said effective weight may vary, and means for preselecting an initial positive or negative constant factor of said effective weight.

2. Apparatus according to claim 1, wherein said drive means is coupled so as to adjust the effective weight of at least some of said rolls simultaneously.

3. Apparatus according to claim 2, wherein each said roll is mounted on a pivoted arm, there being a linearly movable member connected to said arm and to said drive means and movable thereby selectively in two directions thereby to cause said rolls to rise and fall with respect to said web.

4. Apparatus according to claim 3, wherein a resilient member is disposed between each said arm and said linearly movable member.

5. Apparatus according to claim 1, comprising an electrical motor in said drive means and having a control system, said signals comprising input electrical signals fed into said means for comparing said signals and said motor control system being connected to the output of said means for comparing said signals.

6. Apparatus according to calim 1, wherein said means for preselecting an initial positive or negative factor to said effective weight comprises a potentiometer connected to said signal comparing means and to said speed sensing means and operable selectively to increase and reduce the signal from said speed sensing means such that the sum of the signals from said speed sensing means and said potentiometer is compared with a signal from said pressure 7. Apparatus according to claim 1, including a switch whereby when required manual control can be effected such that said speed sensing means, said means for varying the rate at which said effective weight varies, and said means for preselecting an initial positive or negative factor, are over-ridden by a potentiometer selectively adapted to transmit a signal representative of a desired effective weight to said signal comparing means to be compared therein with a signal from said pressure sensing means, whereby the desired effective weight can be automatically maintained irrespective of the speed of movement of the web.

8. Apparatus according to claim 1, wherein a plurality of sets of pressure rolls are provided, said sets being independently adjustable as to their effective weights; said adjustment means, said means for varying the rate at which said effective weight may vary, and said means for preselecting an initial positive or negative constant factor, being provided for each set.

9. Apparatus according to claim 1, wherein the means for varying the rate at which said effective weight varies comprises a potentiometer connected to said signal comparing means and said speed sensing means and having means to vary the value of the signal transmitted from said speed sensing means, such that the resultant signal from said speed sensing means and said potentiometer may be compared in said signal comparing means with a signal from said pressure sensing means.

* * * * *

UNITED STATES PATENT OFFICE
CERTIFICATE OF CORRECTION

Patent No. 4,049,485   Dated September 20, 1977

Inventor(s) Bjorn Iversen

It is certified that error appears in the above-identified patent and that said Letters Patent are hereby corrected as shown below:

Column 4, line 8 change "elctrical" to --electrical--.

Column 4, line 50, claim 6, change "calim" to --claim--.

Column 4, line 58 after "pressure" add --sensing means--.

Signed and Sealed this

Twenty-eighth Day of February 1978

[SEAL]

Attest:

RUTH C. MASON  
Attesting Officer

LUTRELLE F. PARKER  
Acting Commissioner of Patents and Trademarks